(12) United States Patent
Hoffmann et al.

(10) Patent No.: US 8,067,860 B2
(45) Date of Patent: Nov. 29, 2011

(54) ELECTRICAL DEVICE, IN PARTICULAR AN ELECTRICAL HAND-HELD POWER TOOL

(75) Inventors: Erhard Hoffmann, Solothurn (CH); Jan Breitenbach, Stuttgart (DE); Marcin Rejman, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 342 days.

(21) Appl. No.: 11/915,827

(22) PCT Filed: Jul. 25, 2006

(86) PCT No.: PCT/EP2006/064626
§ 371 (c)(1),
(2), (4) Date: Nov. 28, 2007

(87) PCT Pub. No.: WO2007/014877
PCT Pub. Date: Feb. 8, 2007

(65) Prior Publication Data
US 2008/0196553 A1 Aug. 21, 2008

(30) Foreign Application Priority Data

Aug. 3, 2005 (DE) .................. 10 2005 036 449

(51) Int. Cl.
*H02J 7/00* (2006.01)
(52) U.S. Cl. ...................................................... 307/150
(58) Field of Classification Search .............. 307/150; 429/96

See application file for complete search history.

(56) References Cited

U.S. PATENT DOCUMENTS

| 4,751,452 | A | 6/1988 | Kilmer et al. |
| 5,220,520 | A * | 6/1993 | Kessoku .................. 361/679.31 |
| 5,368,954 | A | 11/1994 | Bruns |
| 5,882,888 | A | 3/1999 | Jorgensen |
| 6,139,359 | A | 10/2000 | Fuhreck et al. |
| 6,376,942 | B1 | 4/2002 | Burger et al. |
| 6,436,569 | B1 * | 8/2002 | Dijkstra et al. .................. 429/97 |
| 7,638,233 | B2 * | 12/2009 | Vettoretti et al. .............. 429/100 |

FOREIGN PATENT DOCUMENTS

| AU | 626612 | 8/1992 |
| DE | 38 41 735 | 6/1990 |
| DE | 40 31 090 | 4/1992 |
| EP | 1 036 636 | 9/2000 |
| JP | 2-15277 | 7/1992 |
| WO | 00/65674 | 11/2000 |

\* cited by examiner

*Primary Examiner* — Michael Rutland Wallis
(74) *Attorney, Agent, or Firm* — Michael J. Striker

(57) ABSTRACT

The invention is based on an electric device, in particular an electric hand tool, having a removable power supply unit (18, 70, 104), an accommodation region (16, 102, 132, 144, 156) for accommodating the power supply unit (18, 70, 104), and a locking device (20, 76, 114, 134, 146, 154) for locking the power supply unit (18, 70, 104) to the accommodation region (16, 102, 132, 144, 156). It is proposed that the locking device (20, 76, 114, 134, 146, 154) is provided for the purpose of unlocking the power supply unit (18, 70, 104) from a locked state—by means of a force which is exerted on the power supply unit (18, 70, 104) and moves the entire power supply unit (18, 70, 104) in relation to the accommodation region (16, 102, 132, 144, 156).

10 Claims, 8 Drawing Sheets

ELECTRICAL DEVICE, IN PARTICULAR AN ELECTRICAL HAND-HELD POWER TOOL

CROSS-REFERENCE TO RELATED APPLICATION

The invention described and claimed hereinbelow is also described in German Patent Application DE 10 2005 036 449.7 filed on Aug. 3, 2005. This German Patent Application, whose subject matter is incorporated here by reference, provides the basis for a claim of priority of invention under 35 U.S.C. 119(a)-(d).

BACKGROUND OF THE INVENTION

The present invention relates to an electrical machine, in particular an electrical hand-held power tool.

Publication DE 38 41 735 A1 makes known an electrical hand-held power tool with a removable rechargeable battery and a holder for this rechargeable battery. The holder is provided with two actuatable, spring-loaded push-button blocks, which are used to secure the rechargeable battery in the installed state. To release the rechargeable battery, it is provided with a release push button. When the release push button is pressed, the blocks may be moved into a position that releases the rechargeable battery pack.

SUMMARY OF THE INVENTION

The present invention is directed to an electrical device, in particular an electrical hand-held power tool, with a removable power supply unit, a receiving region for receiving the power supply unit, and a locking device for locking the power supply unit in the receiving region.

It is provided that the locking device serves the purpose of unlocking the power supply unit from a locked state via an application of force, which is applied to the power supply unit and moves the entire power supply unit relative to the receiving region. A particularly easy procedure for removing a power supply unit that is locked in the receiving region is therefore attainable. In addition, the use of an additional unlocking device, e.g., additional actuating elements, may be eliminated, thereby enabling the electrical device to compact in design.

Advantageously, the locking device includes a locking element designed as a spring-loaded element, which, when released, is elastically deformed by the force into a state in which the power supply unit is released. Accidental unlocking by an operator may be advantageously ensured by the fact that the energy of a force applied to the power supply unit, e.g., the weight of the power supply unit, is converted to deformation energy of the spring-loaded element.

In a further embodiment, the spring-loaded element is formed by at least one leaf spring that includes an arresting projection. Space-saving, cost-favorable, existing elements may therefore be used, and a high service life of the locking device may be attained. The leaf springs may be held in a particularly secure manner, in the locked state in particular, via the arresting projection.

A particularly compact embodiment of the electrical device may be attained by the fact that the spring-loaded element is located in a space bounded by energy storage units of the power supply unit. The spring-loaded element may be located—for example, and particularly advantageously—in intermediate spaces formed in adjacent rechargeable battery cells of the power supply unit.

Assembly effort may be easily reduced by the fact that the electrical device includes a housing. The spring-loaded element is formed as one piece with the housing. The receiving region may be formed, e.g., by an inner surface of the housing. As an alternative, the housing may be formed by a housing of the power supply unit.

A particularly secure hold of the spring-loaded element may be attained by the fact that the spring-loaded element is engaged in arresting means when in the locked state. The locking means may be formed, e.g., by a recess in the receiving region, thereby enabling a compact design of the electrical device to be attained.

It is furthermore provided that the spring-loaded element is at least partially released when the power supply unit is guided along the receiving region, and it is loaded starting from this released state before locking occurs. The locking may be indicated in a particularly effective manner via the loading that takes place from the released state, in particular via a resistance that may be felt by the operator. The receiving region may be provided, e.g., with a recess for this purpose, and the spring-loaded element may release when it is guided into this recess. The recess also provides the advantage that, after unlocking, the spring-loaded element may be captured in the recess.

In a further embodiment of the present invention it is provided that the locking device includes a locking element and additional damping means, which are provided to elastically absorb energy produced via a relative motion between the power supply unit and the receiving region. This provides an additional level of assurance against accidental unlocking.

A particularly simple embodiment of the damping means may be attained by the fact that the power supply unit is movable relative to the locking element, and the damping means are formed by at least one element, which provided for deformation and is deformed when the power supply unit moves relative to the locking element. As a result, energy of motion may be absorbed by the damping means before the locking element is actuated.

When a strong load is placed on the electrical device, e.g., a shock, accidental unlocking may be prevented by the fact that the locking device includes a locking element and damping means, which are designed as a shock absorber and act on the locking element. In this context, "shock absorber" refers, in particular, to an element that has the property of reacting in a hard manner to dynamic loads, and of reacting in a soft manner to slow loads. The use of a thermoelastic elastomer that includes, e.g., a viscoelastic material, is particularly advantageous for this application.

In addition, foreign objects may be prevented from accidentally entering the power supply unit by the fact that an inner space of the power supply unit is insulated to the outside by the damping means.

Further advantages result from the description of the drawing, below. Exemplary embodiments of the present invention are shown in the drawing. The drawing, the description and the claims contain numerous features in combination. One skilled in the art will also advantageously consider the features individually and combine them to form further reasonable combinations.

DESCRIPTION OF THE PREFERRED EMBODIMENTS

Figure 1:
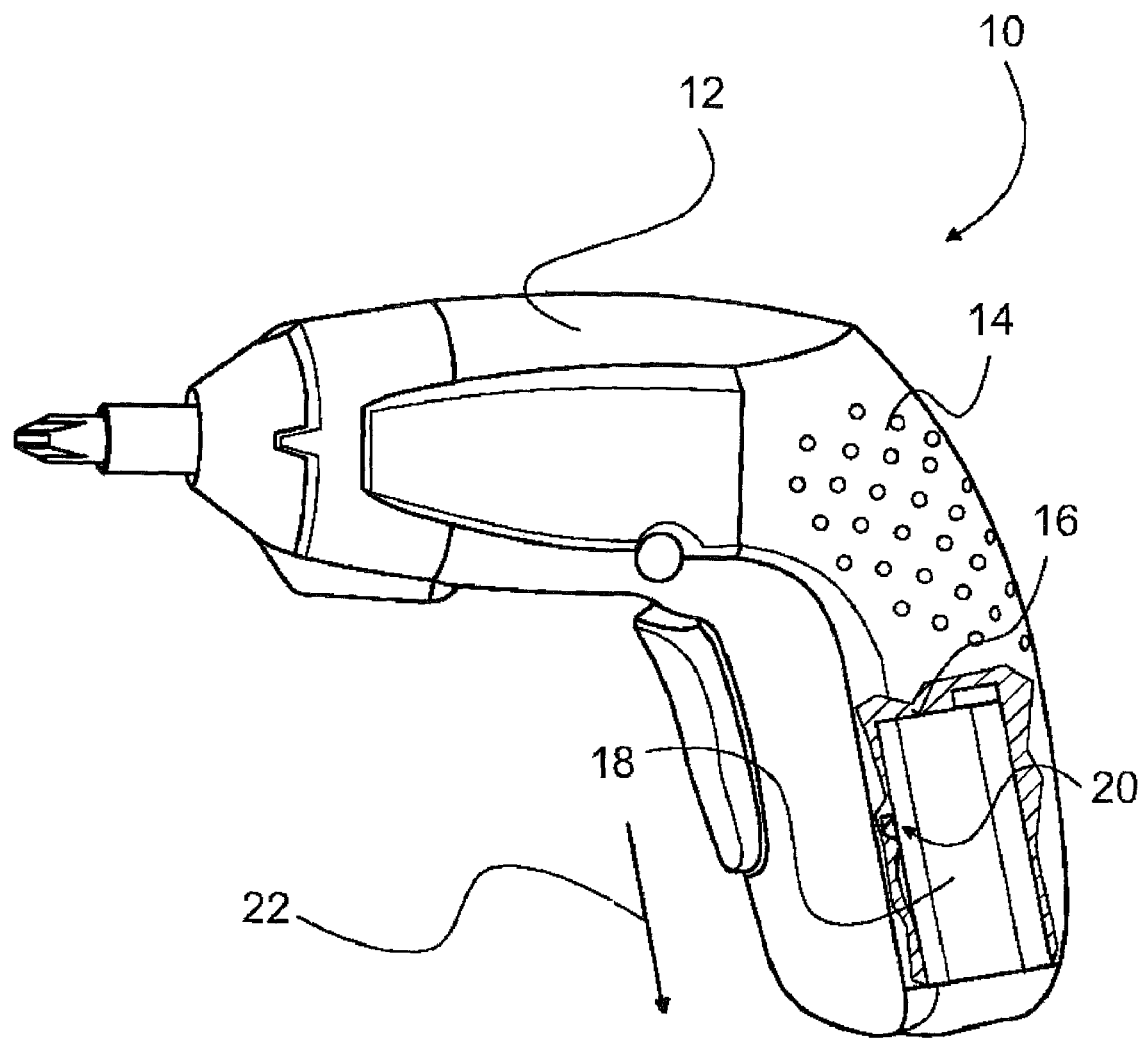
FIG. 1 shows an electrical hand-held power tool with a removable power supply unit.

An electrical device designed as an electrical hand-held power tool 10 is shown in FIG. 1. Electrical hand-held power tool 10 includes a motor housing 12 and a handle 14. A receiving region 16 for receiving a removable power supply unit 18 and a locking device 20—which is shown in greater detail in FIGS. 2 and 3—are provided in handle 14. Locking device 20 serves to lock power supply unit 18 to receiving region 16. After unlocking, power supply unit 18 may be guided in a removing direction 22.

Figure 2:
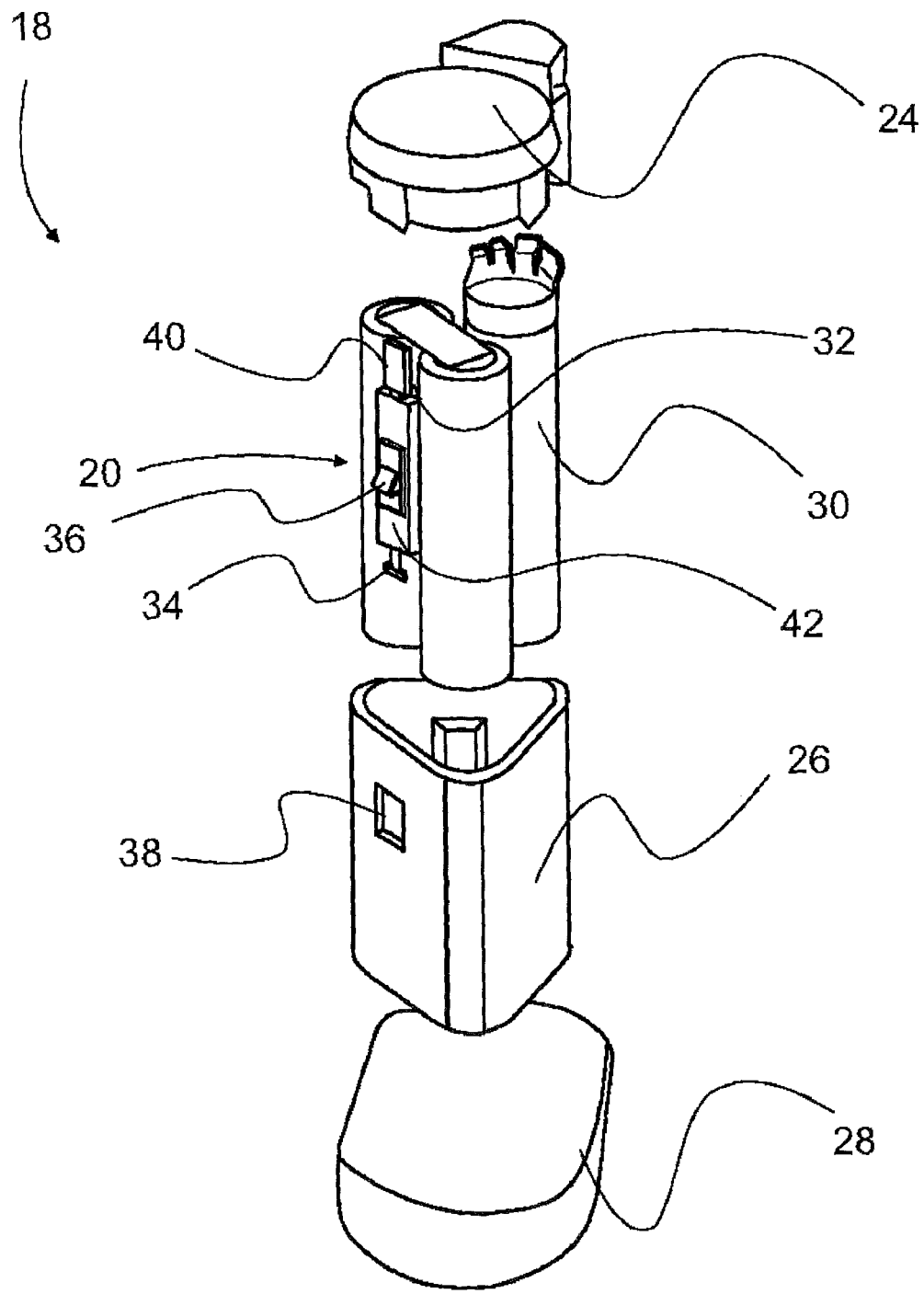
FIG. 2 shows an exploded view of the power supply unit in FIG. 1 with a leaf spring and damping means.

FIG. 2 shows power supply unit 18, in an exploded view. It includes an upper part 24, a rechargeable battery housing 26, and a lower part 28. In an assembled state of power supply unit 18, three energy storage units 30—which are designed as rechargeable battery cells—are located inside rechargeable battery housing 26, onto which upper part 24 is placed. Locking device 20, which includes a locking element designed as spring-loaded element 34, is located in a space 32 between two rechargeable battery cells. Spring-loaded element 34 is formed by a leaf spring and includes an arresting projection 36 designed as a lock-in projection, which, when power supply unit 18 is installed, extends out of an opening 38 of rechargeable battery housing 26. Locking device 20 also includes damping means 40, which are provided in the form of a thermoplastic elastomer. Locking device 20 also includes further damping means 42, which are designed as a shock absorber, and in which spring-loaded element 34 is embedded. Spring-loaded element 34 and damping means 42 are movable relative to rechargeable battery housing 26.

Figure 3:
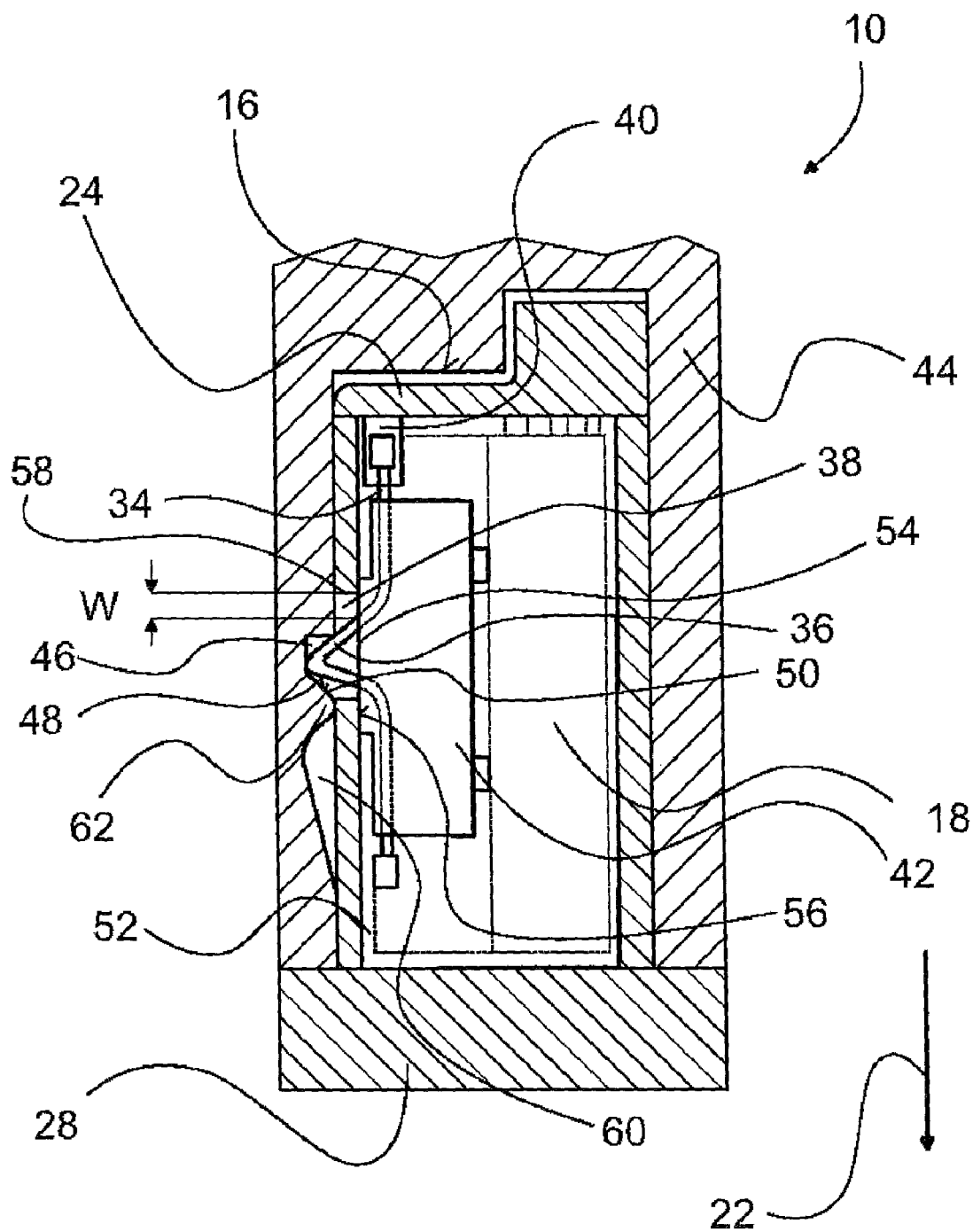
FIG. 3 shows a receiving region of the electrical hand-held power tool with the power supply unit in FIG. 1, locked in the receiving region.

FIG. 3 shows receiving region 16, which is formed by an inner surface of a housing 44 of electrical hand-held power tool 10. Power supply unit 18 is locked in receiving region 16, and arresting projection 36 of spring-loaded element 34 is engaged in arresting means 46, which are designed as a recess in receiving region 16. To securely hold spring element 34 in arresting means 46, arresting projection 36 includes a surface 48 that forms an obtuse angle with removing direction 22, thereby preventing surface 48 from sliding on a surface 50 of arresting means 46. An inner space 52 bounded by rechargeable battery housing 26 is also insulated to the outside by damping means 42, which prevent foreign objects from entering inner space 52 via opening 38. To this end, damping means 42 include a projection 54, which bears partially against a lateral surface 56 of rechargeable battery housing 26. Furthermore, in the locked state, lower part 28 of power supply unit 18 may be gripped by an operator.

To unlock power supply unit 18 from receiving region 16, an operator exerts a pulling force on lower part 28 in removing direction 22. A relative motion between power supply unit 18 and spring-loaded element 34 results, and spring-loaded element 34 remains engaged in arresting means 46 of receiving region 16. During this relative motion, damping means 40 are deformed by the pressure exerted by upper part 24—they are compressed, in particular—and energy from the relative motion is therefore absorbed elastically as deformation energy of damping means 40. A displacement W between spring-loaded element 34 and an edge 58 of opening 38 is provided for the relative motion. When lower part 28 is pulled on further, spring-loaded element 34—its arresting projection 36, in particular—is deformed elastically and disengages from arresting means 46. Damping means 42 react to the deformation of spring-loaded element 34 in a soft manner to a pressure exerted by spring-loaded element 34, and they are compressed. Unlocked power supply unit 18 may then be removed from electrical hand-held power tool 10 using a further pulling force on lower part 28. To unlock, the operator may apply the pulling force with one hand to lower part 28 while he holds electrical hand-held power tool 10 with the other hand. The deformation of spring-loaded element 34 in the state in which power supply unit 18 is released takes place via a pulling force on lower part 28, and no additional actuating elements are required. Accidental unlocking that may result from actuating elements located in handle 14 being actuated may therefore be prevented.

When a relative motion occurs between power supply unit 18 and receiving region 16 in the locked state, which is due, e.g., to strong vibrations of electrical hand-held power tool 10, energy from this motion is absorbed via deformation of damping means 40 before spring-loaded element 34 is actuated. When stronger loads are applied, e.g., when electrical hand-held power tool 10 is dropped, spring-loaded element 34 may be actuated after damping means 40 are compressed, and strong pressure is applied to damping means 42 in a short period of time. Damping means 42 are formed of a thermoplastic elastomer, i.e., they are composed of polyurethane RAKU-PUR 33-C 166/16-5 made by the company Rampf Giesharze. This elastomer has a viscoelastic behavior and reacts in a hard manner to spring element 34 being pressed quickly. It offers strong resistance to spring element 34, which has little play available for deformation, and does not easily disengage from arresting means 46. When extreme loads are applied and spring-loaded element 34 disengages despite the resistance offered by damping means 42, spring-loaded element 34 is captured in a recess 60 of receiving region 16. Unlocked power supply unit 18 may be prevented from falling out immediately, since energy of motion may be converted to deformation energy of spring-loaded element 34 on a lower flank of recess 60.

When power supply unit 18 is unlocked, recess 60 offers further advantages. Power supply unit 18 is guided along receiving region 16 more easily by the fact that spring-loaded element 34 is relieved of tension in recess 60, and power supply unit 18 is prevented from falling out of electrical hand-held power tool 10. To lock power supply unit 18, spring-loaded element 34 is loaded from this unloaded state by gliding along a segment 62, and the operator can clearly feel the resistance. When spring-loaded element 34 engages in arresting means 46 starting from this loaded state, this is indicated in a particularly effective manner, and it is clearly audible to the operator.

Figure 4A:
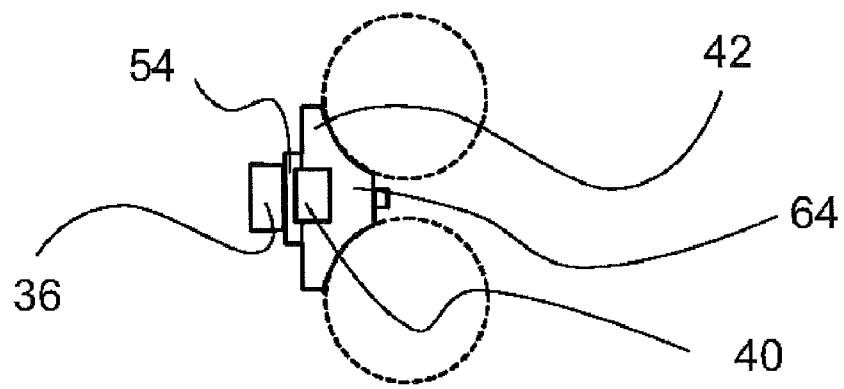
FIG. 4a shows a view of the damping means and the leaf spring in FIG. 2, from above.

Damping means 40, 42 are shown in FIG. 4a, in a view from above. Damping means 42 include a section 64, which bears against rechargeable battery cells indicated with dashed lines. Arresting projection 36 that extends out of projection 54 of damping means 42 is also shown.

Figure 4B:
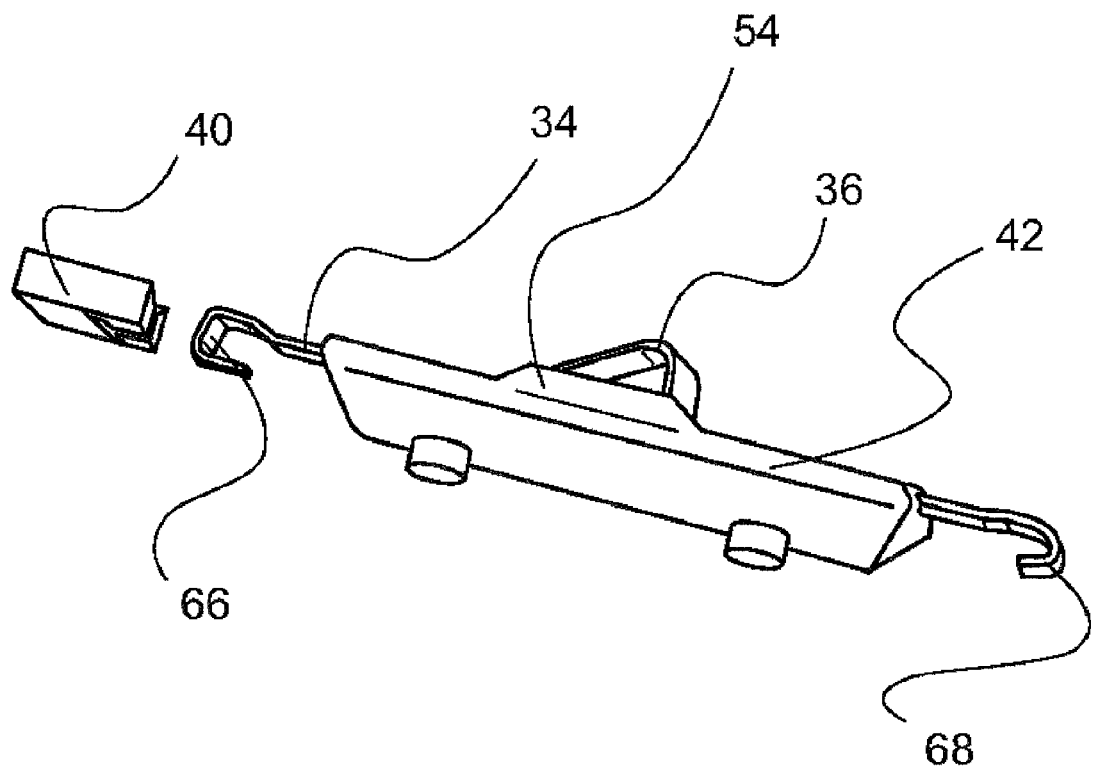
FIG. 4b shows the damping means and the leaf spring in FIG. 2, from the side.

Damping means 40, 42 and spring-loaded element 34 are shown in greater detail in FIG. 4b. Spring-loaded element 34 is embedded in damping means 42, and its arresting projection 36 extends out of projection 54. It also includes two loops 66 and 68. Damping means 40—which are shown separately from spring element 34 in the figure—may be inserted on loop 66, or they may be formed thereon using injection moulding in another embodiment, with which assembly is simplified.

Figure 5:
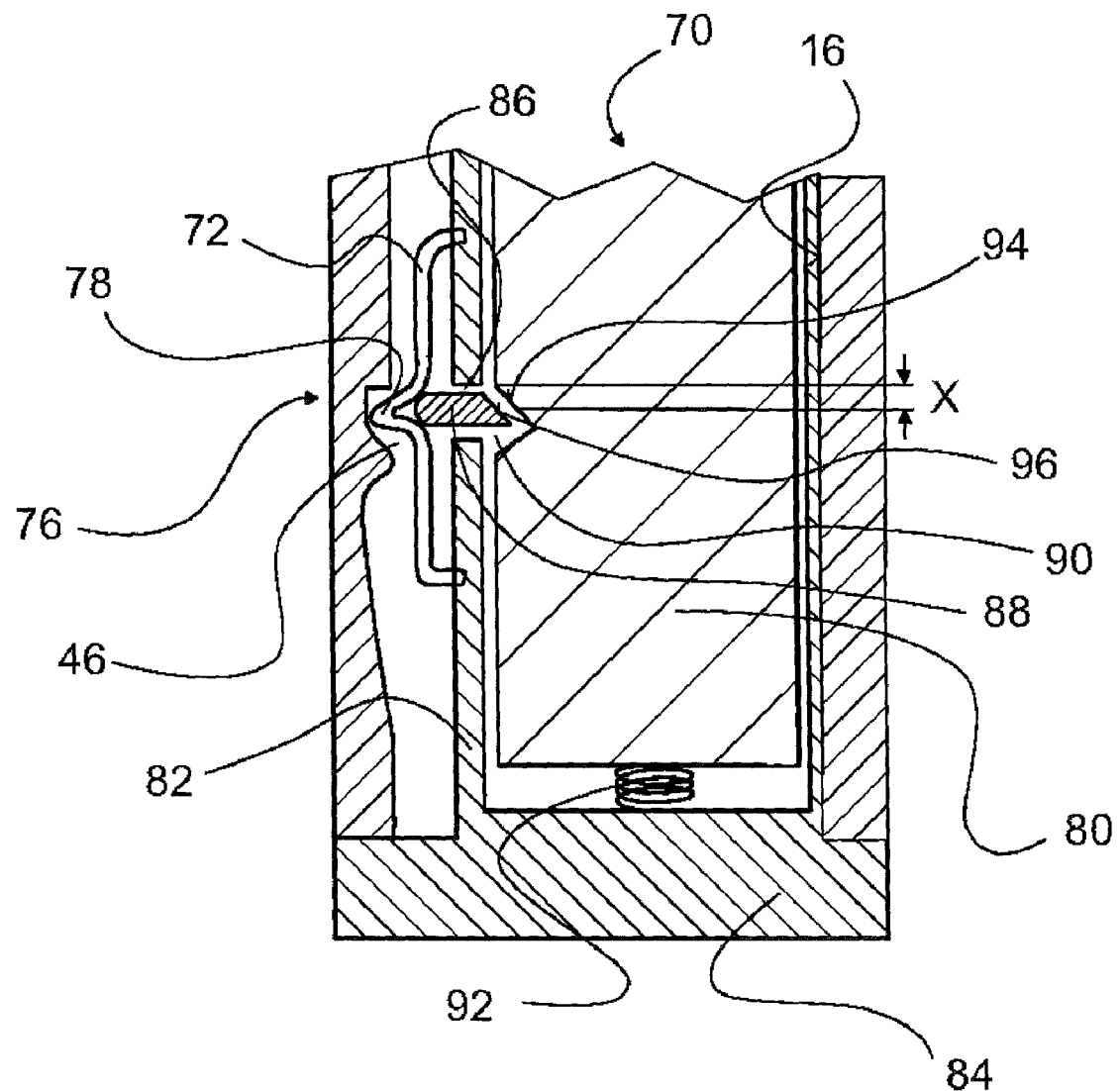
FIG. 5 shows the receiving region in FIG. 3 with an alternative power supply unit.

Receiving region 16, on which a further power supply unit 70 is locked, is shown in FIG. 5. A locking element of a locking device 76 designed as spring-loaded element 72 is secured to power supply unit 70. It includes an arresting projection 78, which is designed as a lock-in projection and which is engaged in arresting means 46. Power supply unit 70 includes a battery unit 80, a rechargeable battery housing 82, and a lower part 84. Rechargeable battery housing 82 includes an opening 86, in which a bolt 88 is located. A recess 90 is provided in battery unit 80 to move bolt 88 in opening 86. A spring 92 is located between battery unit 80—which is movable relative to rechargeable battery housing 82—and rechargeable battery housing 82.

To unlock power supply unit 70, an operator exerts a pulling force on lower part 28. As a result of this force, arresting projection 78 of spring-loaded element 72 is deformed, which presses bolt 88 into opening 86. Arresting projection 78 may deform further as a result, until it disengages from arresting means 46. Power supply unit 70 is therefore released and may be removed from electrical hand-held power tool 10 using a further pulling force on lower part 84. When a load is applied, e.g., when electrical hand-held power tool 10 is dropped, and power supply unit 70 accidentally becomes unlocked, a relative motion between battery unit 80 and rechargeable battery housing 82 occurs, since battery unit 80 has greater inertia than rechargeable battery housing 82. Spring 92 is therefore compressed. When battery unit 80 has moved by spring displacement X, a lateral surface 94 of recess 90 of battery unit 80 bears against a slanted lateral surface 96 of bolt 88. A deformation of spring-loaded element 72 may be prevented in this position of battery unit 80, since bolt 88 is prevented from being pressed into opening 86 by the fact that it bears against lateral surface 84. As an alternative, a deformation of spring-loaded element 72 may be prevented when electrical hand-held power tool 10 is loaded by using a weight that is separate from power supply unit 70 and which is supported such that it is movable relative to receiving region 16. When the load is applied that causes power supply unit 70 to become unlocked, a motion of the weight relative to receiving region 16 results until the weight bears against a blocking element, which prevents deformation of spring-loaded element 72, as is the case with bolt 88 in FIG. 5.

Figure 6:
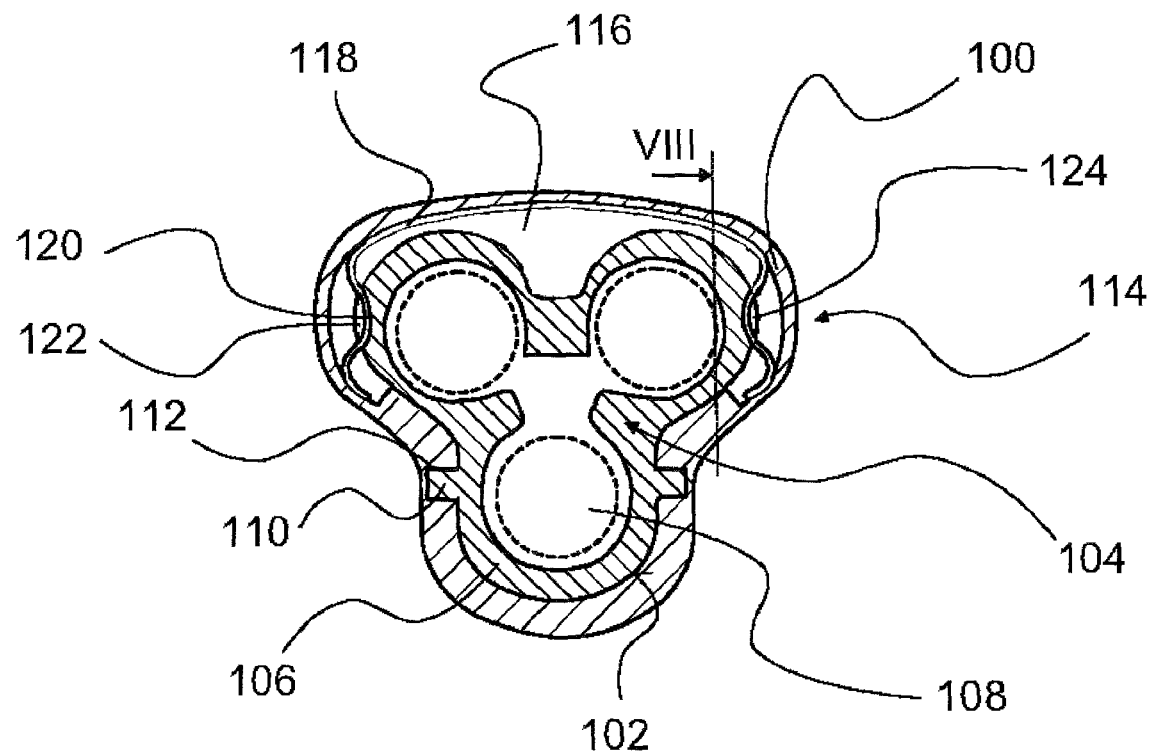
FIG. 6 shows a housing for the electrical hand-held power tool with a receiving region and a further power supply unit.

A further housing 100 of electrical hand-held power tool 10 is shown in FIG. 6. An inner surface of housing 100 forms a receiving region 102, on which a power supply unit 104 is locked. A rechargeable battery housing 106 with two guide rails 110 for guiding power supply unit 104 is shown. Rechargeable battery housing 106 includes three rechargeable battery cells 108. Guide rails 110 engage in corresponding guide grooves 112 of receiving region 102 when guided along receiving region 102. A locking device 114 is also shown, which includes a spring-loaded element 118, which is designed as a wire spring and is inserted in groove 116. At two diametrically opposed points, spring-loaded element 118 extends out of housing 100 in the form of two arresting projections 120. When power supply unit 104 is locked to receiving region 102, these arresting projections 120 engage in arresting means 122, 124—which are designed as recesses—of power supply unit 104.

Figure 7:
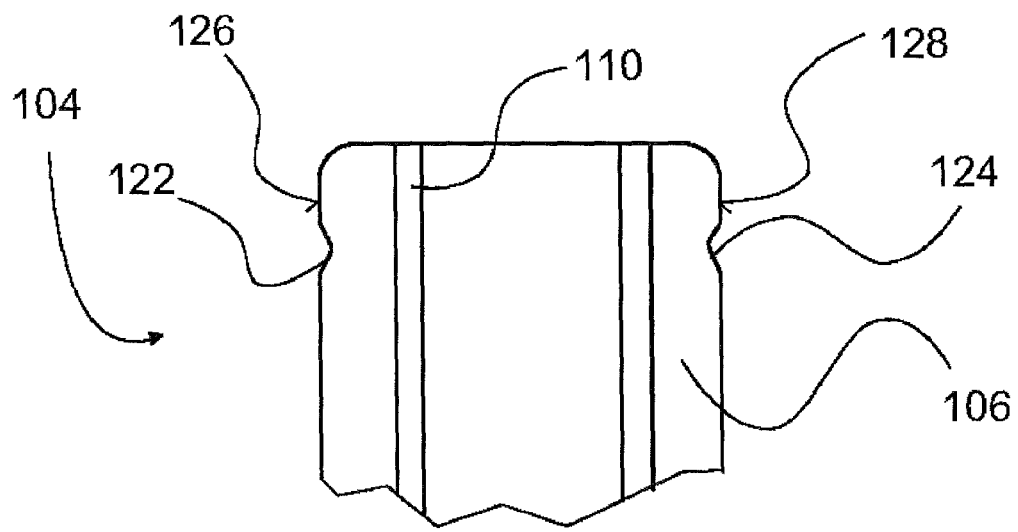
FIG. 7 shows the power supply unit in FIG. 6, in a side view.

Power supply unit 104 is shown in a side view in FIG. 7. Rechargeable battery housing 106 with guide rails 110 is shown. Arresting means 122, 124 include two diametrically opposed lateral surfaces 126, 128 of rechargeable battery housing 106, each of which is provided for engaging a spring-loaded element on the device in receiving region 102 when locking occurs.

Figure 8:
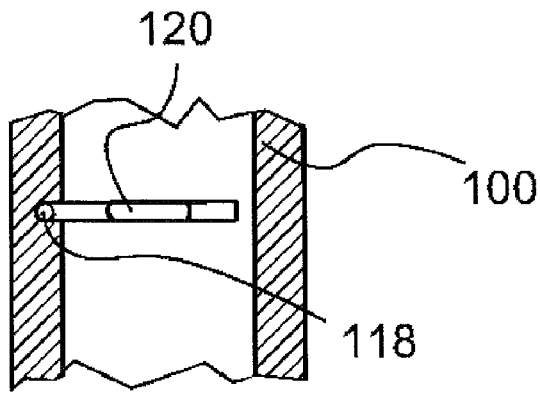
FIG. 8 shows a cross section through the housing in FIG. 6.

FIG. 8 shows a cross section through housing 100. Spring-loaded element 118 that includes outwardly-extending arresting projection 120 and is inserted in housing 100 is shown.

Figure 9:
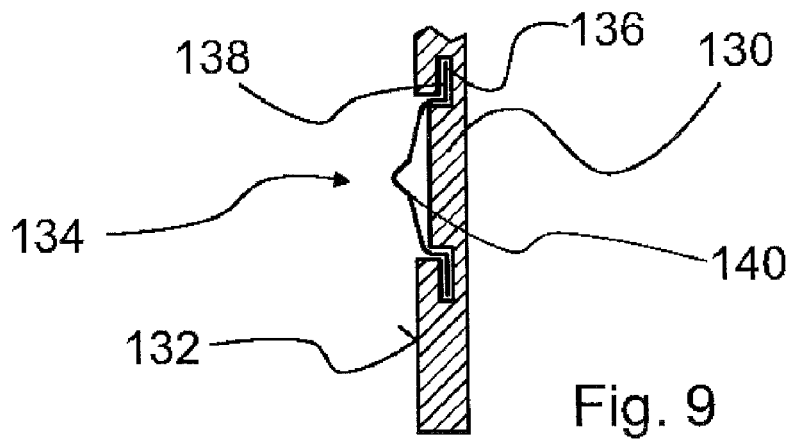
FIG. 9 shows a further housing with an inserted metal spring, in a side view.
Figure 10:
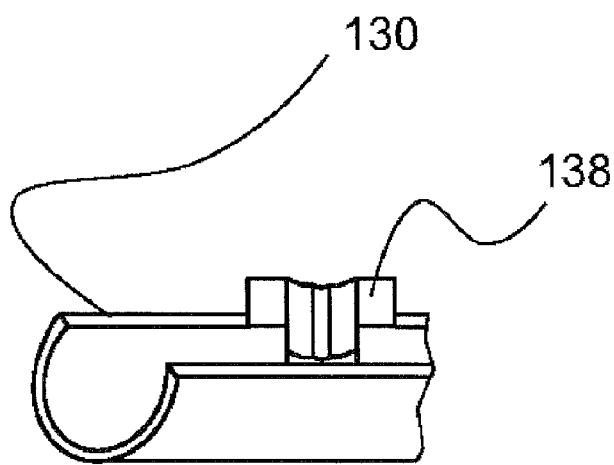
FIG. 10 shows the housing in FIG. 9, in a perspective view.

An embodiment of a further housing 130 of electrical hand-held power tool 10 is shown in FIG. 9. Housing 130 forms a receiving region 132 for receiving power supply unit 104. A locking device 134 is shown, which includes a spring-loaded element 138 that is designed as a metal spring and is inserted in a recess 136. It includes an arresting projection 140, which extends out of recess 136 and, in the locked state of power supply unit 104, is engaged in arresting means 122 of power supply unit 104. Housing 130 with spring element 138 inserted is shown in a perspective view in FIG. 10.

Figure 11:
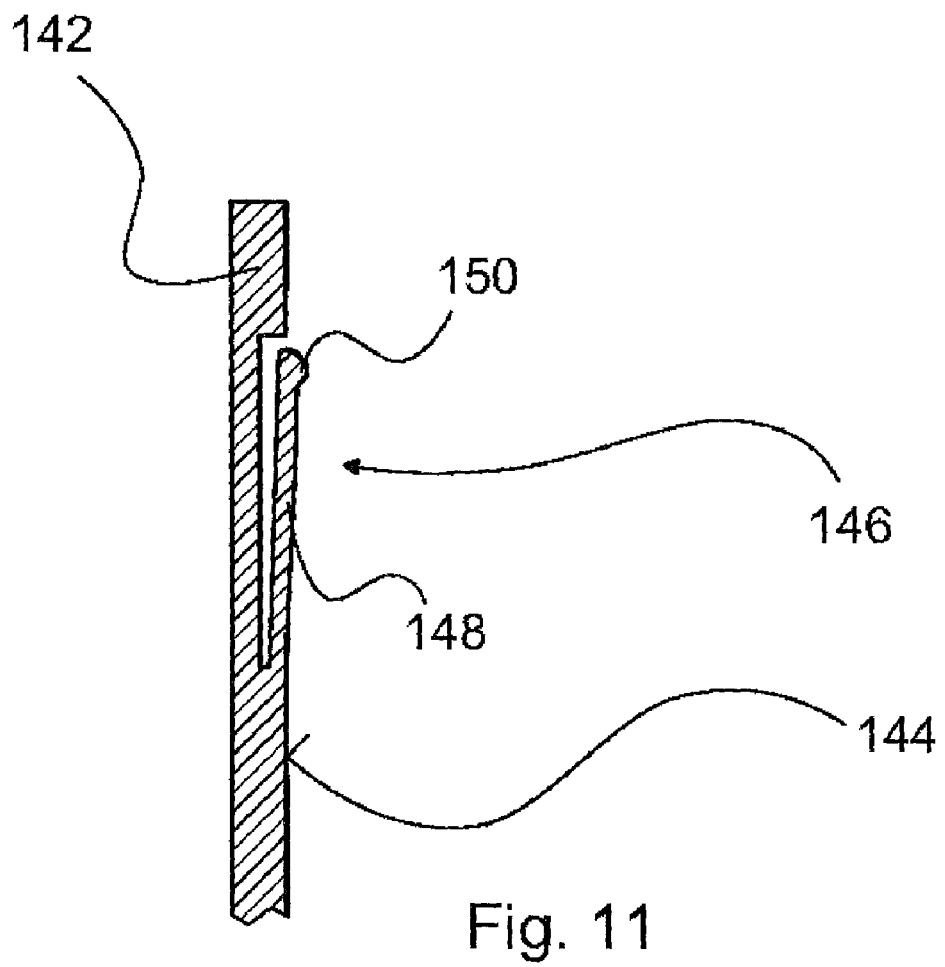
FIG. 11 shows a further housing with a snap-to element, in a profile view.

A further embodiment of a housing 10 of electrical hand-held power tool 10 is shown in FIG. 11. Housing 142 forms a receiving region 144 for receiving power supply unit 104. A locking device 146 that includes a spring-loaded element 148 is shown. Spring-loaded element 148 is formed as one piece with housing 142, and, in fact, in the form of a snap-to element with an arresting projection 150, which is engaged in arresting means 122 when power supply unit 104 is in the locked state.

Figure 12:
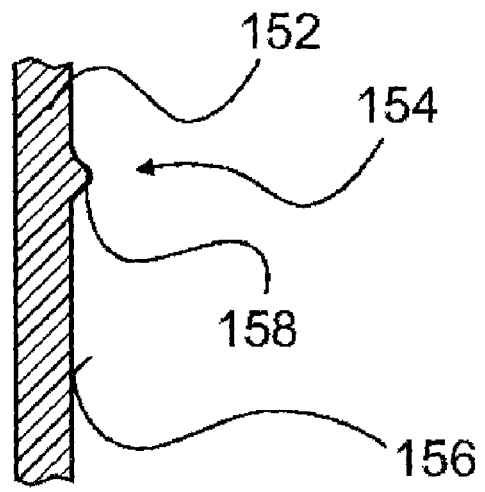
FIG. 12 shows a further housing with a segment, in a profile view.

In the exemplary embodiment shown in FIG. 12, a spring-loaded element 152 of a locking device 154 is formed by a housing for electrical hand-held power tool 10 that is provided for deformation. The housing, which forms a receiving region 156 for receiving power supply unit 104, includes an arresting projection 158 designed as a segment, which engages in arresting means 122 when power supply unit 104 is locked.

| Reference numerals | |
|---|---|
| 10 | Electrical hand-held power tool |
| 12 | Motor housing |
| 14 | Handle |
| 16 | Receiving area |
| 18 | Power supply unit |
| 20 | Locking device |
| 22 | Removing direction |
| 24 | Upper part |
| 26 | Rechargeable battery housing |
| 28 | Lower part |
| 30 | Energy storage unit |
| 32 | Space |
| 34 | Spring-loaded element |
| 36 | Arresting projection |
| 38 | Opening |
| 40 | Damping means |
| 42 | Damping means |
| 44 | Housing |
| 46 | Arresting means |
| 48 | Surface |
| 50 | Surface |
| 52 | Inner space |
| 54 | Projection |
| 56 | Lateral surface |
| 58 | Edge |
| 60 | Recess |
| 62 | Segment |
| 64 | Section |
| 66 | Loop |
| 68 | Loop |
| 70 | Power supply unit |
| 72 | Spring-loaded element |
| 76 | Locking device |
| 78 | Arresting projection |
| 80 | Battery unit |
| 82 | Rechargeable battery housing |
| 84 | Lower part |

-continued

| Reference numerals | |
|---|---|
| 86 | Opening |
| 88 | Bolt |
| 90 | Recess |
| 92 | Spring |
| 94 | Lateral surface |
| 96 | Lateral surface |
| 100 | Housing |
| 102 | Receiving region |
| 104 | Power supply unit |
| 106 | Rechargeable battery housing |
| 108 | Rechargeable battery cell |
| 110 | Guide rail |
| 112 | Guide groove |
| 114 | Locking device |
| 116 | Groove |
| 118 | Spring-loaded element |
| 120 | Arresting projection |
| 122 | Arresting means |
| 124 | Arresting means |
| 126 | Lateral surface |
| 128 | Lateral surface |
| 130 | Housing |
| 132 | Receiving region |
| 134 | Locking device |
| 136 | Recess |
| 138 | Spring-loaded element |
| 140 | Arresting projection |
| 142 | Housing |
| 144 | Receiving region |
| 146 | Locking device |
| 148 | Spring-loaded element |
| 150 | Arresting projection |
| 152 | Spring-loaded element |
| 154 | Locking device |
| 156 | Receiving region |
| 158 | Arresting projection |
| W | Displacement |
| X | Spring displacement |

What is claimed is:

1. An electrical device, in particular an electrical hand-held power tool, with a removable power supply unit (18, 70, 104), a receiving region (16, 102, 132, 144, 156) for accommodating the power supply unit (18, 70, 104), and a locking device (20, 76, 114, 134, 146, 154) configured for locking the power supply unit (18, 70, 104) to the receiving region (16, 102, 132, 144, 156) by application of an upward pushing force applied directly by a grasping hand, and for unlocking and releasing the power supply unit (18, 70, 104) from the receiving region (16, 102, 132, 144, 156) by application of a downward pulling force applied directly by a grasping hand, which pushing and pulling forces move the entire power supply unit (18, 70, 104) relative to the receiving region (16, 102, 132, 144, 156), wherein the locking device (20, 76, 114, 134, 146, 154) includes a locking element, which is designed as a spring-loaded element (34, 72, 118, 138, 148, 152) that is elastically deformed by the pulling force when unlocked into a state that releases the power supply unit (18, 70, 104) and by the pushing force applied to lock the power supply unit (18, 70, 104); and wherein the receiving region (16) comprises a wall, an arresting means (46) with which spring-loaded element (34, 72, 118, 138, 148, 152) is engaged when the power supply unit (18, 70, 104) is locked in the receiving region (16, 102, 133, 144, 156) and a recess (60) in which the spring-loaded element (34) is received when the power supply unit (18, 70, 104) is unlocked, wherein the arresting means (46) and the recess (60) are provided in the receiving region wall in a spaced arrangement with respect to a removing direction and wherein the recess (60) is arranged downstream relative to the arresting means (46) as seen in the removing direction (22).

2. The electrical device as recited in claim 1, wherein the spring-loaded element (34) is formed by at least one leaf spring, which includes an arresting projection (36).

3. An electrical device, in particular an electrical hand-held power tool, with a removable power supply unit (18, 70, 104), a receiving region (16, 102, 132, 144, 156) for accommodating the power supply unit (18, 70, 104), and a locking device (20, 76, 114, 134, 146, 154) for locking the power supply unit (18, 70, 104) to the receiving region (16, 102, 132, 144, 156), wherein the locking device (20, 76, 114, 134, 146, 154) is provided for the purpose of unlocking the power supply unit (18, 70, 104) from a locked state via the application of a force, which is applied to the power supply unit (18, 70, 104) and moves the entire power supply unit (18, 70, 104) relative to the receiving region (16, 102, 132, 144, 156), wherein the locking device (20, 76, 114, 134, 146, 154) includes a locking element, which is designed as a spring-loaded element (34, 72, 118, 138, 148, 152) and is elastically deformed by the force when unlocked into a state that releases the power supply unit (18, 70, 104); and wherein the receiving region (16) comprises a wall, an arresting means (46) with which spring-loaded element (34, 72, 118, 138, 148, 152) is engaged when the power supply unit (18, 70, 104) is locked in the receiving region (16, 102, 133, 144, 156) and a recess (60) in which the spring-loaded element (34) is received when the power supply unit (18, 70, 104) is unlocked, wherein the arresting means (46) and the recess (60) are provided in the receiving region wall in a spaced arrangement with respect to a removing direction and wherein the recess (60) is arranged downstream relative to the arresting means (46) as seen in the removing direction (22), wherein the spring-loaded element (34) is located in a space (32) bounded by energy storage units (30) of the power supply unit (18).

4. The electrical device as recited in claim 1, characterized by a housing (142); the spring-loaded element (148) is formed as one piece with the housing (142).

5. The electrical device as recited in claim 1, wherein the spring-loaded element (34, 72, 118, 138, 148, 152) is engaged in an arresting element (46, 122, 124) when in the locked state.

6. The electrical device as recited in claim 1, wherein, when the power supply unit (18, 70) is slid into the receiving region (16), the spring-loaded element (34, 72) is at least partially released, and, from this unloaded state, is loaded before locking takes place.

7. The electrical device as recited in claim 1, wherein the locking device (20) includes the locking element and additional damping means (40), which is provided to elastically absorb energy produced via a relative motion between the power supply unit (18) and the receiving region (16).

8. The electrical device as recited in claim 7, wherein the power supply unit (18) is movable relative to the locking element, and the damping means (40) are formed by at least one element, which provided for deformation and is deformed when the power supply unit (18) moves relative to the locking element.

9. The electrical device as recited in claim 1, wherein the locking device (20) includes a locking element and damping means (42), which are designed as a shock absorber and act on the locking element.

10. The electrical device as recited in claim 7, wherein an interior space (52) of the power supply unit (18) is insulated to the outside by the damping means (42).

* * * * *